(12) United States Patent
Chen et al.

(10) Patent No.: US 8,830,883 B2
(45) Date of Patent: Sep. 9, 2014

(54) METHOD AND APPARATUS FOR IMPROVING ACKNOWLEDGEMENT/NEGATIVE ACKNOWLEDGEMENT FEEDBACK

(75) Inventors: Wanshi Chen, San Diego, CA (US); Xiliang Luo, Northridge, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 13/296,030

(22) Filed: Nov. 14, 2011

(65) Prior Publication Data

US 2012/0294204 A1 Nov. 22, 2012

Related U.S. Application Data

(60) Provisional application No. 61/414,351, filed on Nov. 16, 2010.

(51) Int. Cl.
*H04J 3/00* (2006.01)
*H04W 4/00* (2009.01)

(52) U.S. Cl.
USPC .......................................... 370/280; 370/329

(58) Field of Classification Search
None
See application file for complete search history.

(56) References Cited

U.S. PATENT DOCUMENTS

| | | |
|---|---|---|
| 2009/0241004 A1 | 9/2009 | Ahn et al. |
| 2010/0015967 A1 | 1/2010 | Perets et al. |
| 2010/0098012 A1 | 4/2010 | Bala et al. |
| 2010/0195624 A1 | 8/2010 | Zhang et al. |
| 2012/0099491 A1* | 4/2012 | Lee et al. ........................ 370/280 |
| 2012/0106407 A1* | 5/2012 | Papasakellariou et al. ... 370/280 |
| 2012/0106478 A1* | 5/2012 | Han et al. ....................... 370/329 |
| 2012/0207107 A1* | 8/2012 | Li et al. ........................... 370/329 |

(Continued)

FOREIGN PATENT DOCUMENTS

| | | |
|---|---|---|
| EP | 2299751 A1 | 3/2011 |
| JP | 2009510975 A | 3/2009 |

(Continued)

OTHER PUBLICATIONS

Notification of Transmittal of the International Search Report and the Written Opinion of the International Searching Authority, or the Declaration, International Search Report and Written Opinion mailed Jan. 23, 2012 in International Application No. PCT/US2011/060830.

(Continued)

*Primary Examiner* — Suk Jin Kang
(74) *Attorney, Agent, or Firm* — Arent Fox LLP

(57) ABSTRACT

A method, apparatus, and computer program product for wireless communication are provided to receive a downlink grant including a transmission power control (TPC) command and a downlink assignment index (DAI) for an uplink subframe, determine that a value for at least one of the TPC commands is an ACK/NACK resource indicator for an uplink control channel resource based on a value of the DAI, and transmit one or more ACK/NACK bits using the uplink control channel resource. In another example, an eNB may be equipped to transmit a downlink grant including TPC command and DAI for an uplink subframe, wherein the DAI is greater than 1 and the TPC command is replaced with an ACK/NACK resource indicator, and receive a signal including uplink control channel information, where ACK/NACK feedback for one or more downlink subframes associated with the uplink subframe are included in a resource indicated by the resource indicator.

36 Claims, 13 Drawing Sheets

(56) References Cited

U.S. PATENT DOCUMENTS

| | | | | |
|---|---|---|---|---|
| 2012/0236812 A1* | 9/2012 | Chen et al. | .................... | 370/329 |
| 2012/0314674 A1* | 12/2012 | Seo et al. | ...................... | 370/329 |
| 2012/0320805 A1* | 12/2012 | Yang et al. | .................... | 370/280 |
| 2012/0320813 A1* | 12/2012 | Han et al. | ...................... | 370/311 |
| 2012/0327916 A1* | 12/2012 | Ahn et al. | ...................... | 370/336 |
| 2013/0010743 A1* | 1/2013 | Ahn et al. | ...................... | 370/329 |
| 2013/0044653 A1* | 2/2013 | Yang et al. | .................... | 370/280 |
| 2013/0077523 A1* | 3/2013 | Ko et al. | ........................ | 370/252 |
| 2013/0083741 A1* | 4/2013 | Larsson et al. | ................ | 370/329 |
| 2013/0128833 A1* | 5/2013 | Lee et al. | ...................... | 370/329 |
| 2013/0163487 A1* | 6/2013 | Yang et al. | .................... | 370/281 |
| 2013/0163553 A1* | 6/2013 | Lee et al. | ...................... | 370/329 |
| 2013/0176920 A1* | 7/2013 | Seo et al. | ...................... | 370/280 |
| 2013/0176982 A1* | 7/2013 | Han et al. | ...................... | 370/329 |

FOREIGN PATENT DOCUMENTS

| | | | |
|---|---|---|---|
| JP | 2009177723 A | | 8/2009 |
| JP | 2010098580 A | | 4/2010 |
| JP | 2010232741 A | | 10/2010 |
| JP | 2012521158 A | | 9/2012 |
| KR | 20113085 A | | 1/2011 |
| WO | 2009157364 A1 | | 12/2009 |
| WO | 2010107674 A2 | | 9/2010 |
| WO | WO 2011/139027 A2 | | 11/2011 |

OTHER PUBLICATIONS

LG Electronics: "ACK/NACK on PUCCH for TDD", 3GPP Draft; R1-106099, 3rd Generation Partnership Project (3GPP) Mobile Competence Centre; 650 Route Des Lucioles; F-06921 Sophia-Antipoles Cedex; France vol. RAN WG1, No. Jacksonville, USA; Nov. 11, 2010, XP050489853.

Huawaei et al.: "UL ACK/NACK feedback related DCI design for carrier aggregation", 3GPP Draft; R1-101943, 3rd Generation Partnership Project (3GPP), Mobile Competence Centre; 650, Route Des Lucioles; F-06921 Sophia-Antipolis Cedex; France, vol. RAN WF1, No. Beijing, China; Apr. 6, 2010, XP050419287.

Huawei et al.: "ACK/NACK feedback with channel selection for TDD", 3GPP Draft; R1-106152, 3rd Generation Partnership Project (3GPP), Mobile Competence Centre; 650, Route Des Lucioles; F-06921 Sophia-Antipolis Cedex, France, vol. RAN WG1, No. Jacksonville, USA, Nov. 9, 2010, XP050489611.

U.S. Appl. No. 61/133,264, filed May 11, 2010.

U.S. Appl. No. 61/360,427, filed Jun. 30, 2010.

U.S. Appl. No. 61/332,167, filed May 6, 2010.

International Search Report and the Written Opinion of the International Searching Authority, or the Declaration, International Search Report and Written Opinion mailed Jan. 23, 2012 in International Application No. PCT/US2011/060830.

Notification Concerning Transmittal of the International Preliminary Report on Patentability mailed May 30, 2013 in International Application No. PCT/US2011/060830.

European Patent Office Application No. 11788732.3—Munich Germany mailed Jun. 27, 2013.

Taiwan Search Report—TW100141629—TIPO—Dec. 12, 2013.

Translation of Japanese Office Action for Japanese Application No. 2013-539954 dated May 7, 2014, pp. 1-7.

* cited by examiner

METHOD AND APPARATUS FOR IMPROVING ACKNOWLEDGEMENT/NEGATIVE ACKNOWLEDGEMENT FEEDBACK

CROSS-REFERENCE TO RELATED APPLICATION(S)

This application claims the benefit of U.S. Provisional Application Ser. No. 61/414,351, entitled "ACKNOWLEDGEMENT/NEGATIVE ACKNOWLEDGEMENT FEEDBACK FOR SINGLE CARRIER TDD" and filed on Nov. 16, 2010, which is expressly incorporated by reference herein in its entirety.

BACKGROUND

1. Field

The present disclosure relates generally to communication systems, and more particularly, to a providing improved acknowledgement/negative acknowledgement (ACK/NACK) feedback for various uplink/downlink configurations.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing ACK/NACK feedback in an uplink subframe. In one example, a user equipment (UE) may be equipped to receive a downlink grant including a transmission power control (TPC) command and a downlink assignment index (DAI) for an uplink subframe. Further, the UE may be equipped to determine that a value for at least one of the TPC commands is an ACK/NACK resource indicator for an uplink control channel resource based on a value of the DAI. Still further, the UE may be equipped to transmit, during the uplink subframe, one or more ACK/NACK bits using the uplink control channel resource. In another example, an evolved Node B (eNB) may be equipped to transmit a downlink grant including a TPC command and a DAI for an uplink subframe, wherein the DAI is greater than 1 and wherein the TPC command is replaced with an ACK/NACK resource indicator, and receive a signal including uplink control channel information, where ACK/NACK feedback for one or more downlink subframes associated with the uplink subframe are included in an uplink control channel resource indicated by the ACK/NACK resource indicator.

According to related aspects, a method for providing uplink ACK/NACK feedback configurations is provided. The method can include receiving a downlink grant for scheduling data transmissions, wherein the downlink grant includes a TPC command and a DAI for an uplink subframe. Furthermore, the method may include determining that a value for at least one of the TPC commands is an ACK/NACK resource indicator for an uplink control channel resource based on a value of the DAI. Moreover, the method can include transmitting, during the uplink subframe, one or more ACK/NACK bits using the uplink control channel resource.

Another aspect relates to a wireless communications apparatus. The wireless communications apparatus can include means for receiving a downlink grant for scheduling data transmissions, wherein the downlink grant includes a TPC command and a DAI for an uplink subframe. Furthermore, the wireless communications apparatus can include means for determining that a value for at least one of the TPC commands is an ACK/NACK resource indicator for an uplink control channel resource based on a value of the DAI. Moreover, the wireless communications apparatus can include means for transmitting, during the uplink subframe, one or more ACK/NACK bits using the uplink control channel resource.

Another aspect relates to a wireless communications apparatus. The apparatus can include a processing system configured to receive a downlink grant for scheduling data transmissions, wherein the downlink grant includes a TPC command and a DAI for an uplink subframe. Furthermore, the processing system may be configured to determine that a value for at least one of the TPC commands is an ACK/NACK resource indicator for an uplink control channel resource based on a value of the DAI. Moreover, the processing system may further be configured to transmit, during the uplink subframe, one or more ACK/NACK bits using the uplink control channel resource.

Another aspect relates to a computer program product, which can have a computer-readable medium comprising code for receiving a downlink grant for scheduling data transmissions, wherein the downlink grant includes a TPC command and a DAI for an uplink subframe. Furthermore, the computer-readable medium can include code for determining a value for at least one of the TPC commands as an ACK/

NACK resource indicator for an uplink control channel resource based on a value of the DAI. Moreover, the computer-readable medium can include code for transmitting, during the uplink subframe, one or more ACK/NACK bits using the uplink control channel resource.

According to related aspects, a method for processing improved ACK/NACK feedback is provided. The method can include transmitting a downlink grant for scheduling data transmissions, wherein the downlink grant includes a TPC command and a DAI for an uplink subframe, wherein the DAI is greater than 1 and wherein the TPC command is replaced with an ACK/NACK resource indicator. Moreover, the method can include receiving a signal including uplink control channel information, where ACK/NACK feedback for one or more downlink subframes associated with the uplink subframe are included in an uplink control channel resource indicated by the ACK/NACK resource indicator.

Another aspect relates to a wireless communications apparatus. The wireless communications apparatus can include means for transmitting a downlink grant for scheduling data transmissions, wherein the downlink grant includes a TPC command and a DAI for an uplink subframe, wherein the DAI is greater than 1 and wherein the TPC command is replaced with an ACK/NACK resource indicator. Moreover, the wireless communications apparatus can include means for receiving a signal including uplink control channel information, where ACK/NACK feedback for one or more downlink subframes associated with the uplink subframe are included in an uplink control channel resource indicated by the ACK/NACK resource indicator.

Another aspect relates to a wireless communications apparatus. The apparatus can include a processing system configured to transmit a downlink grant for scheduling data transmissions, wherein the downlink grant includes a TPC command and a DAI for an uplink subframe, wherein the DAI is greater than 1 and wherein the TPC command is replaced with an ACK/NACK resource indicator. Moreover, the processing system may further be configured to receive a signal including uplink control channel information, where ACK/NACK feedback for one or more downlink subframes associated with the uplink subframe are included in an uplink control channel resource indicated by the ACK/NACK resource indicator.

Another aspect relates to a computer program product, which can have a computer-readable medium comprising code for transmitting a downlink grant for scheduling data transmissions, wherein the downlink grant includes a TPC command and a DAI for an uplink subframe, wherein the DAI is greater than 1 and wherein the TPC command is replaced with an ACK/NACK resource indicator. Moreover, the computer-readable medium can include code for receiving a signal including uplink control channel information, where ACK/NACK feedback for one or more downlink subframes associated with the uplink subframe are included in an uplink control channel resource indicated by the ACK/NACK resource indicator.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
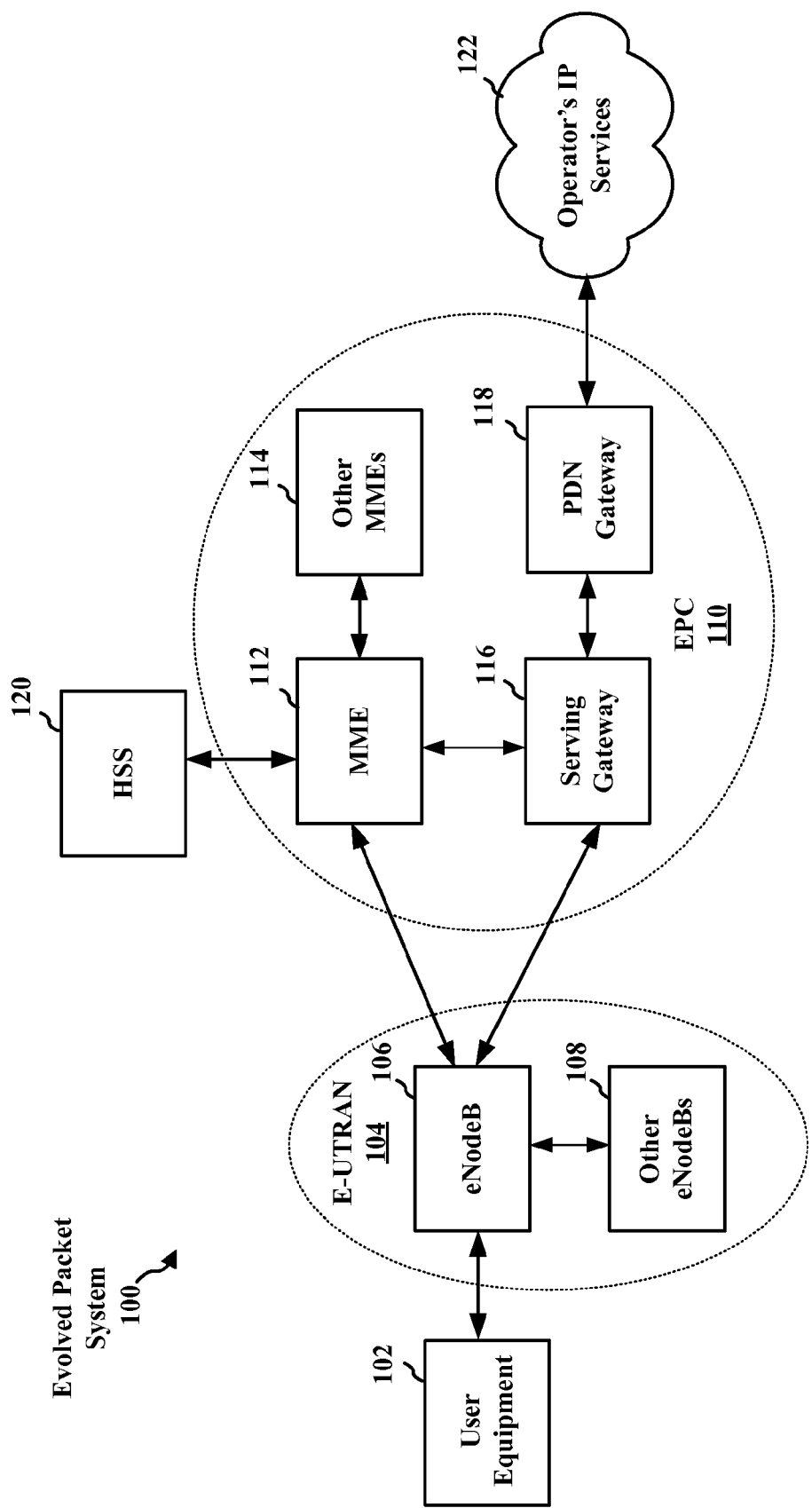
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 may be connected by an S1 interface to the EPC 110. The EPC 110 includes a Mobility Management Entity (MME) 112, other MMEs 114, a Serving Gateway 116, and a Packet Data Network (PDN) Gateway 118. The MME 112 may be the control node that processes the signaling between the UE 102 and the EPC 110. Generally, the MME 112 provides bearer and connection management. All user IP packets may be transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
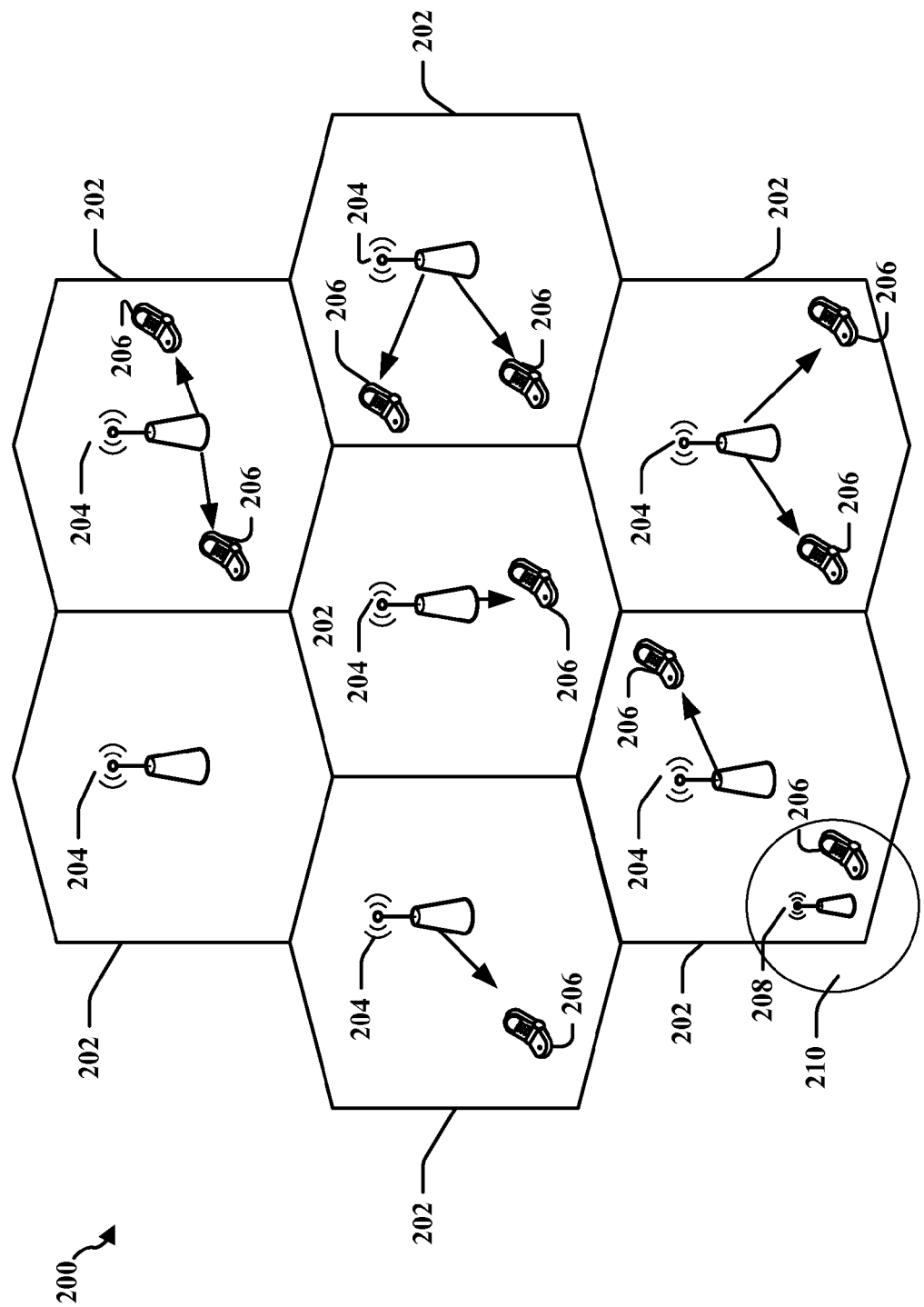
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity.

This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
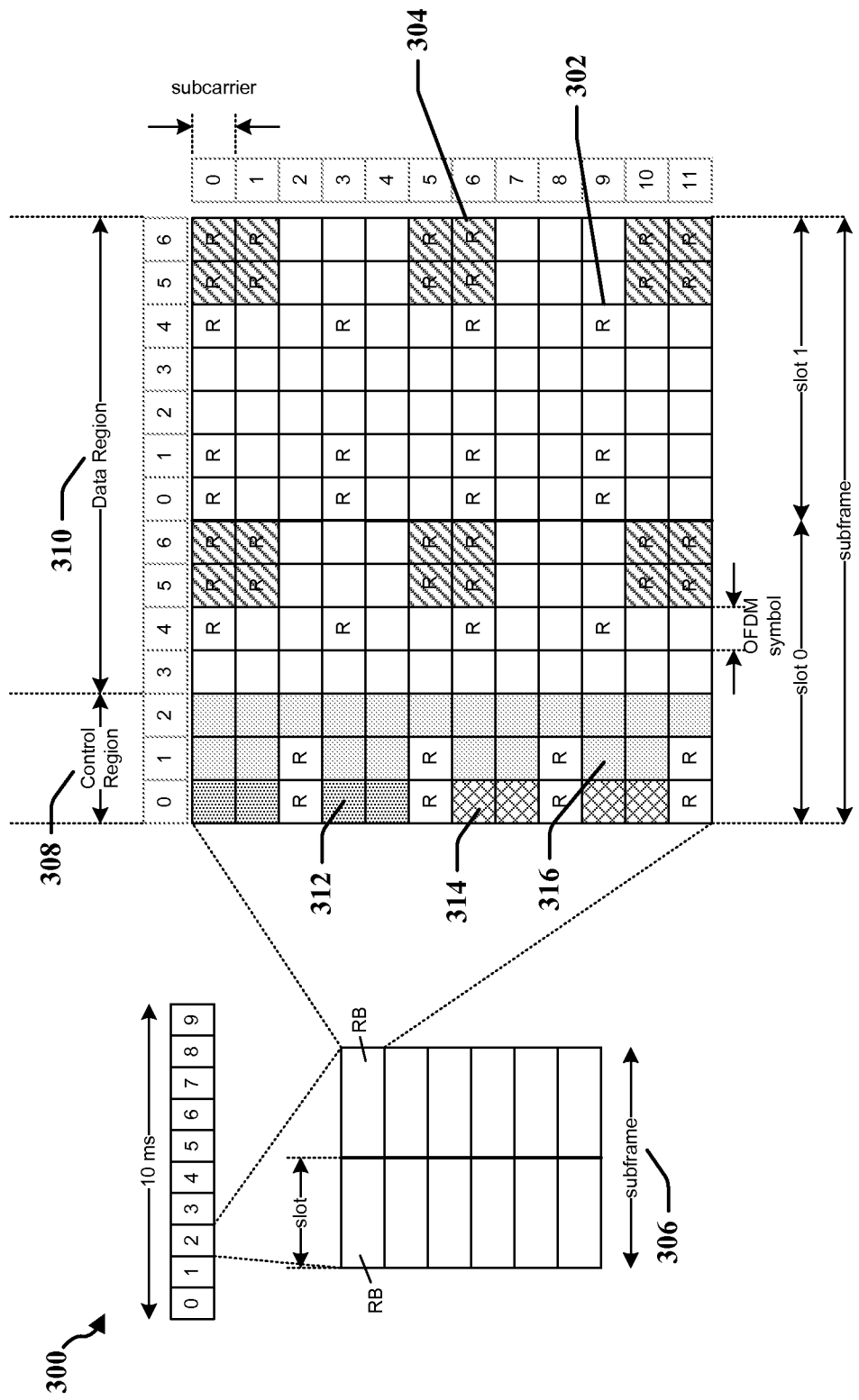
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames 306. Further, each subframe 306 may be allocated for downlink or uplink communications. Table 1 provides an example set of possible subframe distributions for a time division duplexing (TDD) scheme.

in the frequency domain and, for a normal cyclic prefix in each OFDM symbol, 7 consecutive OFDM symbols in the time domain, or 84 resource elements. For a extended cyclic prefix in each OFDM symbol, there are 6 consecutive OFDM symbols in the time domain, or 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Sub-frame 306 may be organized into a control region 308 and a data region 310. Control region 308 may include resources elements that may be allocated for various physical control channels. For example, control region 308 may include resource elements allocated to physical control format indictor channel (PCFICH) 312, physical hybrid ARQ indicator channel (PHICH) 314, and physical downlink control channel (PDCCH) 316.

PDCCH 316 may convey control information, such as but not limited to transmit power control (TPC), downlink assignment index (DAI), etc. Generally, a UE may use the TPC value to assist in uplink power control operations. In one aspect, the TPC field may be a 2-bit field. Generally, DAI may assist the UE to detect the missing downlink assignment(s) and facilitate more efficient ACK/NAK feedback. In one aspect, DAI denotes the accumulative number of PDCCH(s) with assigned PDSCH transmission(s) and PDCCH indicating DL SPS release up to the present subframe within subframe(s) n-k, k belongs to K. In another aspect, the DAI field may be a 2-bit field. In such an aspect, the DAI field may be present in downlink control information (DCI) formats 1/1A/

TABLE 1

Uplink-Downlink Configurations for TDD System

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As used in Table 1, "D" refers to a downlink slot, "U" refers to an uplink slot and "S" refers to a special slot. In one aspect, a special slot may placed between U and D slots and include control information, for example, a downlink pilot time slot (DwPTS) a gap (GP) and a uplink pilot time slot (UpPTS). Further, as noted in Table 1, in some configurations (e.g., 0, 1, 2, and 6) the 10 subframes in the frame may be organized so that there is a repetition of the subframe organization structure within the subframe (e.g., a periodicity of 5 ms). While in other configurations (e.g., 3, 4, and 5) there is no repetition of the subframe organization structure within the subframe (e.g., a periodicity of 10 ms). Each sub-frame 306 may include two consecutive time slots. A resource grid may be used to represent two time slots, each time slot including a resource block. The resource grid is divided into multiple resource elements. In LTE, a resource block contains 12 consecutive subcarriers 1B/1D/2/2A/2B/2C. A 2-bit DAI field may be present in UL DCI format 0. In such an aspect, the field represents the total number of subframes with PDSCH transmissions and with PDCCH indicating downlink SPS release detected by the UE. In a non-carrier aggregation implementation, a DAI may be present in all DL grants, and all the subframes may use the same DL transmission mode. In such an implementation, the accumulative definition of DAI makes it possible to define the codebook based on DAI. For example, if the UE does not receive a DL grants then no PUCCH transmission is returned. Generally, if the UE receives any DL grant, the placement of ACK/NACK feedback bit(s) for the grant may start with (DAI-1)*K, where K is the number of ACK/NAK bits per subframe. For example, if DAI is equal to one then the grant used for ACK/NAK bit(s) feedback starts with 0. In one aspect, if the UE detects the missing of any DL grants, the UE may feedback DTX either explicitly or implicitly (e.g., DTX is coded the same as NACK).

A UE may know the specific REGs used for the PHICH 314 and the PCFICH 312. The UE may search different combinations of REGs for the PDCCH 316. The number of combinations to search is typically less than the number of allowed combinations for the PDCCH 316. An eNB may send the PDCCH 316 to the UE in any of the combinations that the UE may search.

Figure 4:
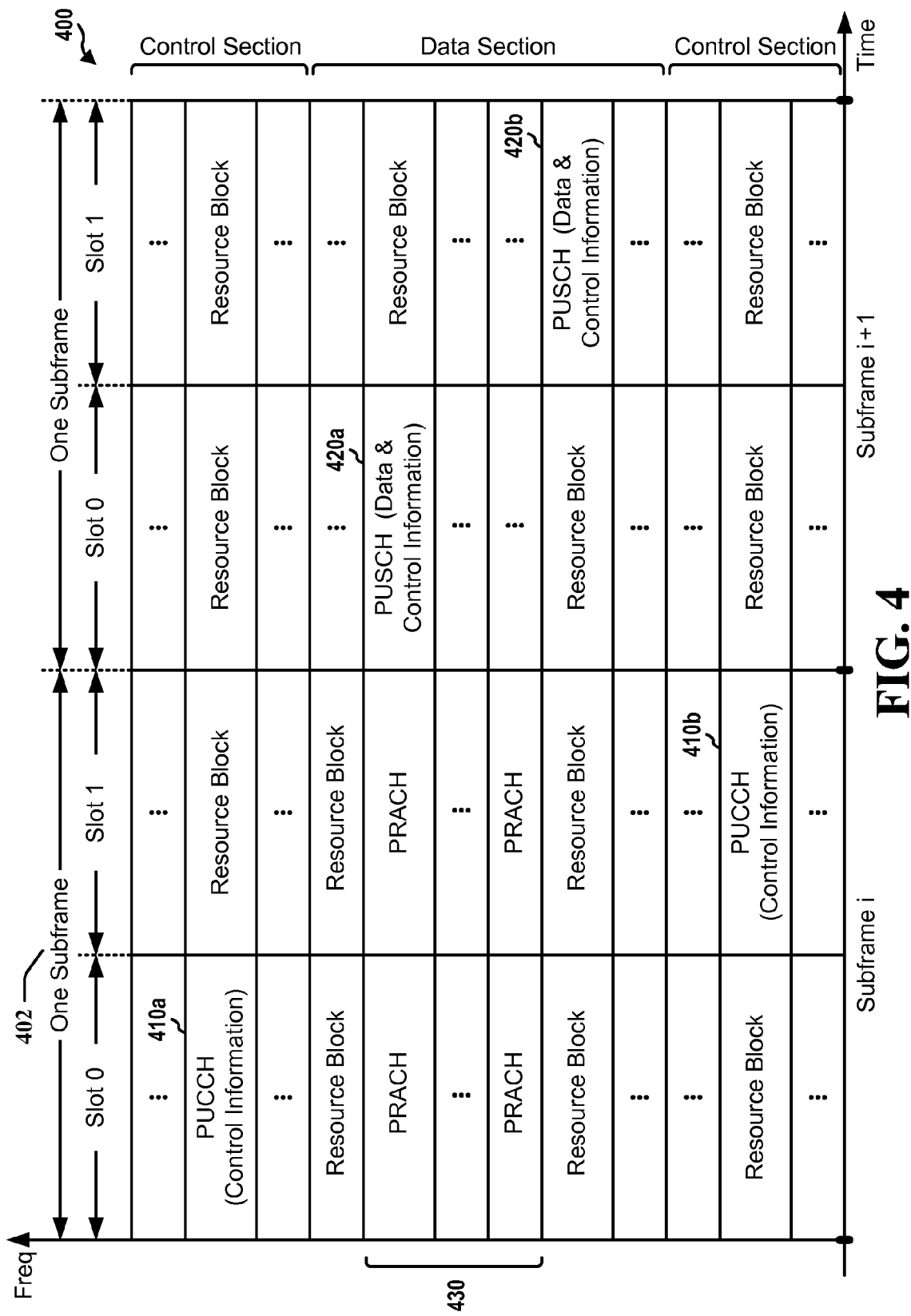
FIG. 4 is a diagram illustrating an example of an UL frame structure in LTE.

FIG. 4 is a diagram 400 illustrating an example of an UL frame structure in LTE. The UL frame structure may be divided into subframes 402. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe 402 and may hop across frequency.

A set of resource blocks may be used to perform initial system access and achieve UL synchronization in a physical random access channel (PRACH) 430. The PRACH 430 carries a random sequence and may not carry UL data/signaling. Each random access preamble may occupy a bandwidth corresponding to six consecutive resource blocks. The starting frequency may be specified by the network. For example, the transmission of the random access preamble may be restricted to certain time and frequency resources. Further, there may be no frequency hopping for the PRACH. The PRACH attempt is carried in a single subframe (1 ms) or in a sequence of few contiguous subframes and a UE can make only a single PRACH attempt per frame (10 ms).

The number of bits allocated to ACK/NACK may impact a variety of operations in wireless communication. For discrete Fourier transform-spread-OFDM (DFT-S-OFDM), the ACK/NAK payload size may impact Reed-Muller coding. For example, if greater than 11 bits are allocated to ACK/NACK, the ACK/NACK bits may be segmented into two blocks for ACK/NACK communication operations. The number of ACK/NACK bits may also impact PUCCH power control, as well as resource determination for uplink control information (UCI) when the UCI is piggybacked on PUSCH.

Various feedback values (e.g., ACK/NACK, channel quality indicator (CQI), scheduling request (SR), etc.) may be included in feedback on a PUCCH. In one aspect, ACK/NACK and SR may be jointly coded, with the SR bit (ON/OFF) appended at the end. In such an aspect, an eNB and UE may be aligned on the location of SR. In another aspect, ACK/NACK and CQI may be jointly coded, with the CQI/pre-coding matrix information (PMI)/rank indication (RI) appended at the end. In such an aspect, an eNB and UE may be aligned on the location of CQI. Such alignment assists in assuring accurate reception of ACK/NACK information. Further, the feedback may be ordered as ACK/NACK followed by SR followed by CQI. An example mapping used for ACK/NACK feedback transmitted with the SR resource is provided in Table 2

TABLE 2

Mapping between multiple ACK/NACK responses and b(0), b(1)

| Number of ACK among multiple detected ACK/NACK responses | b(0), b(1) |
| --- | --- |
| 0 or None (UE detect at least one DL assignment is missed) | 0, 0 |
| 1 | 1, 1 |
| 2 | 1, 0 |
| 3 | 0, 1 |
| 4 | 1, 1 |
| 5 | 1, 0 |
| 6 | 0, 1 |
| 7 | 1, 1 |

In non-carrier aggregation configurations, one UL subframe 402 may be used to provide feedback (e.g., ACK/NACK) for multiple (N) (e.g., N=1, 2, 3, 4, 9) DL subframes based on a DL hybrid automatic repeat request (HARD) timing relationship. For example, in configuration number 5 described in Table 1, one UL subframe may provide feedback for 9 DL subframes.

As discussed in more detail with respect to FIGS. 7-13, in one aspect, the 2-bit TPC field in PDCCHs of some downlink subframe(s) associated with a given uplink subframe may be reinterpreted as a resource indication (ACK/NACK resource indicator) for PUCCH format 3. For example, the TPC value in PDCCHs in which the DAI value is greater than one, can be reinterpreted as an ACK/NACK resource indicator, while a PDCCH in which the DAI value equals 1 carries the regular TPC commands for PUCCH. In one aspect, higher layers (e.g. the radio resource control layer) may configure one or more PUCCH resources, and the ACK/NACK resource indicator may indicate which of the configured resources may be used by the UE for ACK/NACK feedback. In another aspect, the ACK/NACK resource indicator may indicate an offset, relative to the higher layer configured control channel resource, which specifies the control channel resource for use as the uplink control channel resource. In another aspect, the UE may be higher layer (e.g., RRC layer) configured with one resource without an ACK/NACK resource indicator.

Figure 5:
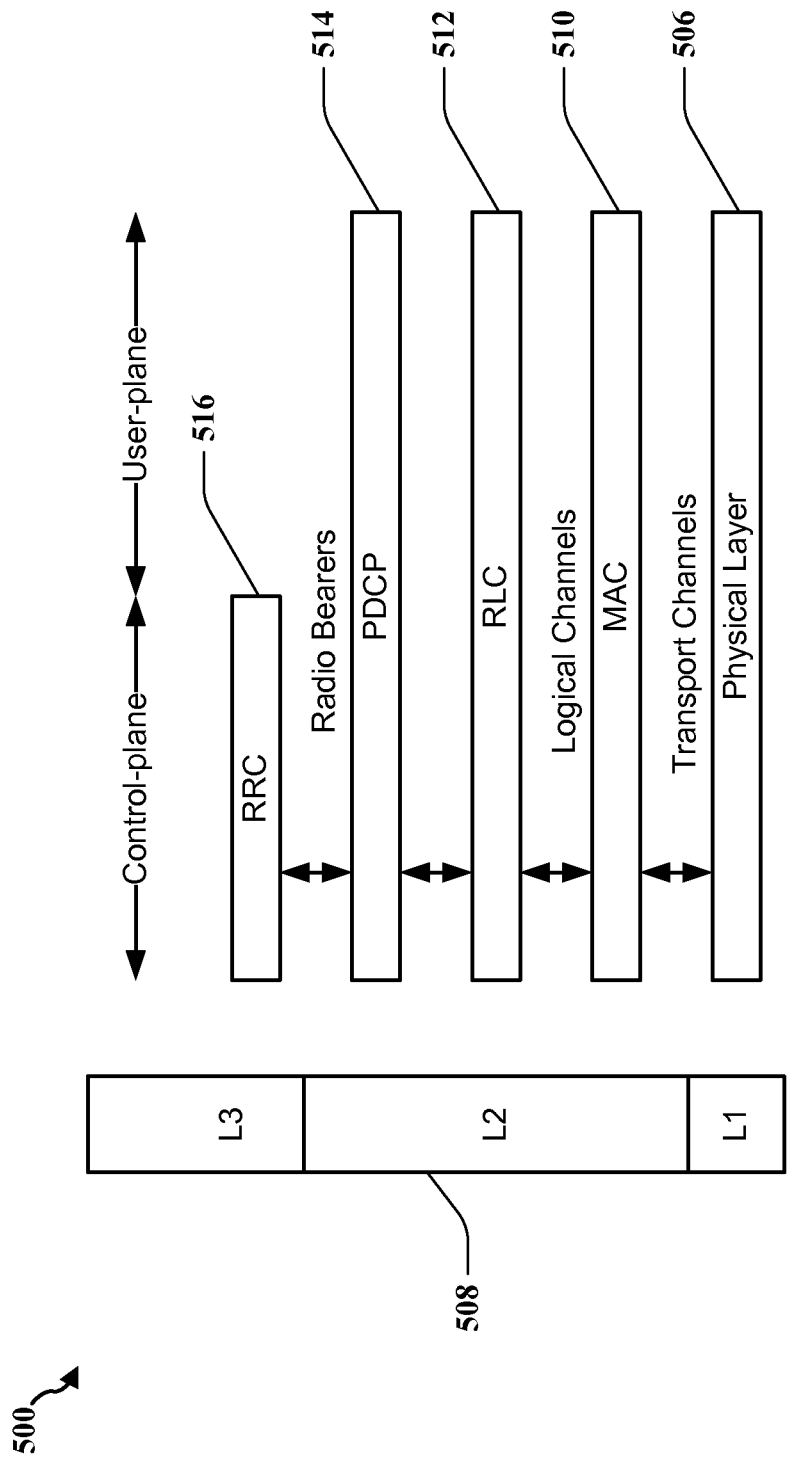
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to HARQ. The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE. In one aspect, RRC signaling may be used to configure one or more resources for communicating ACK/NACK feedback. For example, RRC signaling may configure a resource to communicating ACK/NACK feedback using PUCCH format 3.

Figure 6:
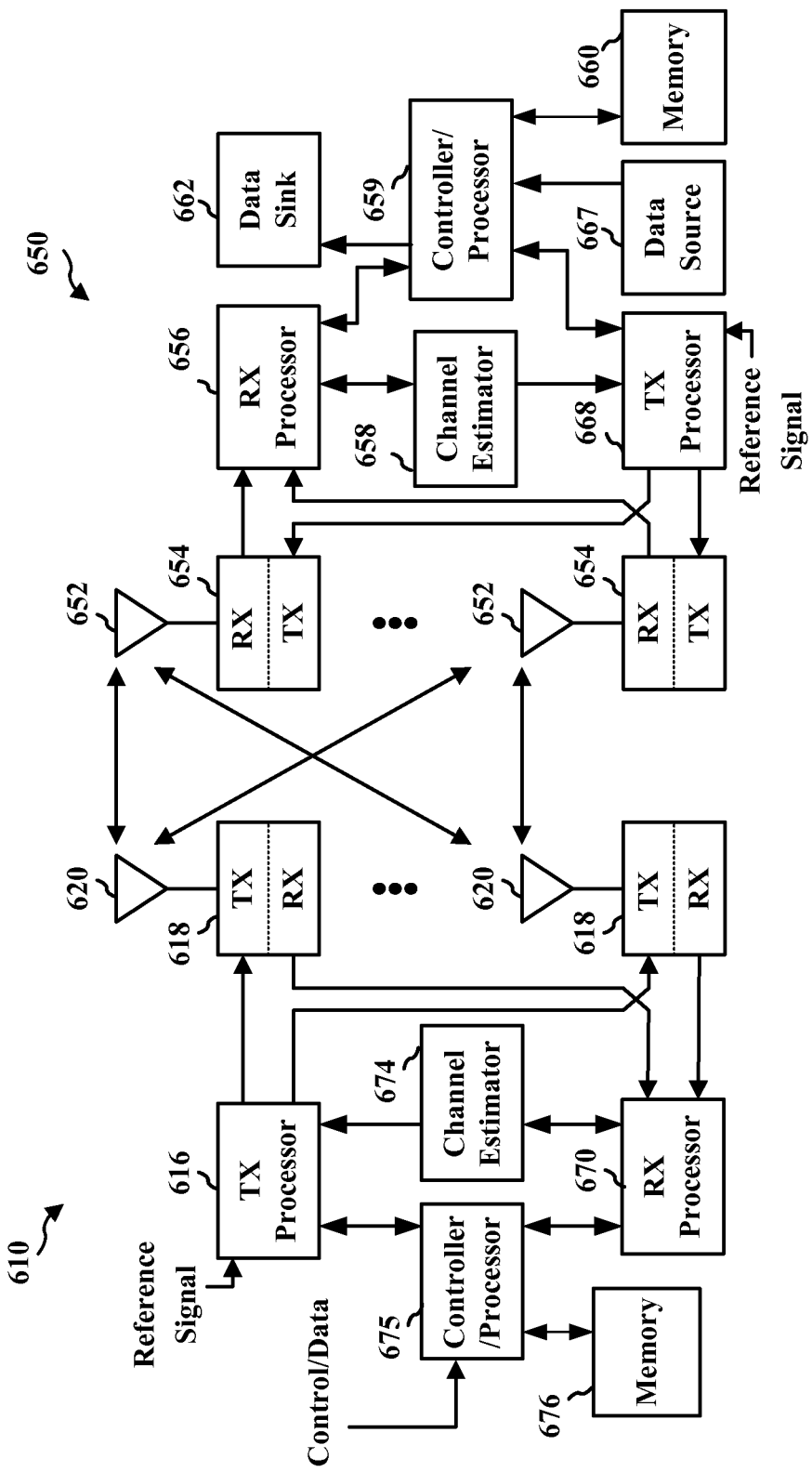
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
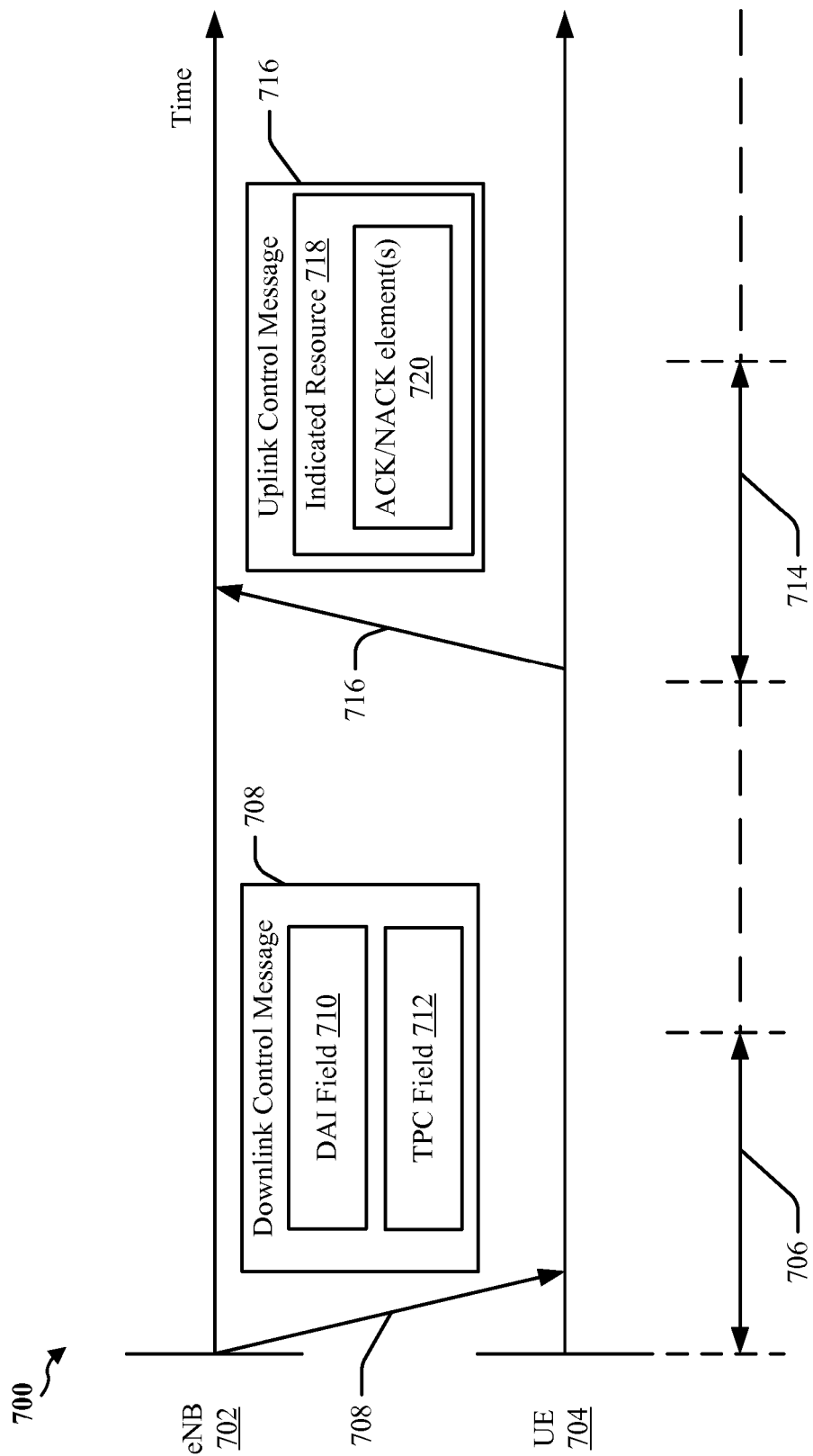
FIG. 7 is a diagram illustrating an evolved NodeB and user equipment using improved ACK/NACK feedback procedures.

FIG. 7 is a diagram 700 illustrating an eNB and UE performing an improved ACK/NACK feedback procedure in an access network. As depicted in FIG. 7, activities associated with eNB 702 and UE 704 are described against a time axis. In operation, during a downlink subframe 706, eNB 702 may transmit downlink control message 708. In one aspect, downlink control message 708 may include fields such as, but not limited to, DAI field 710, and TPC field 712. In operation, DAI field 710 may be set to a value greater than one. In such an operation aspect, where the DAI field 710 is greater than one, then the TPC field may be reinterpreted as an ACK/NACK resource indicator. ACK/NACK resource indicator may indicate a resource, configured by higher layers, for providing ACK/NACK feedback during an uplink subframe 714. Upon the occurrence of uplink subframe 714, UE 704 may transmit uplink control message 716 with the indicated resource 718 configured to provide one or more ACK/NACK elements 720. In one aspect, the higher layers may configure the resource to support PUCCH format 3. PUCCH format 3 may support transmission of 20 ACK/NACK feedback elements using DFT-S-OFDM. For example, using DFT-S-OFDM, ACK/NACK bits may be equally segmented into two ACK/NACK blocks where each ACK/NACK block may include less than or equal to 11 bits. The blocks may then be encoded with the Rel-8 Reed-Muller (RM) (32, O) coding with the last eight rows punctured and modulated into 12 QPSK symbols. The 24 QPSK symbols (2 blocks of 12 QPSK symbols) may be collected alternatively from the two ACK/NACK blocks are transmitted on two slots.

Figure 8:
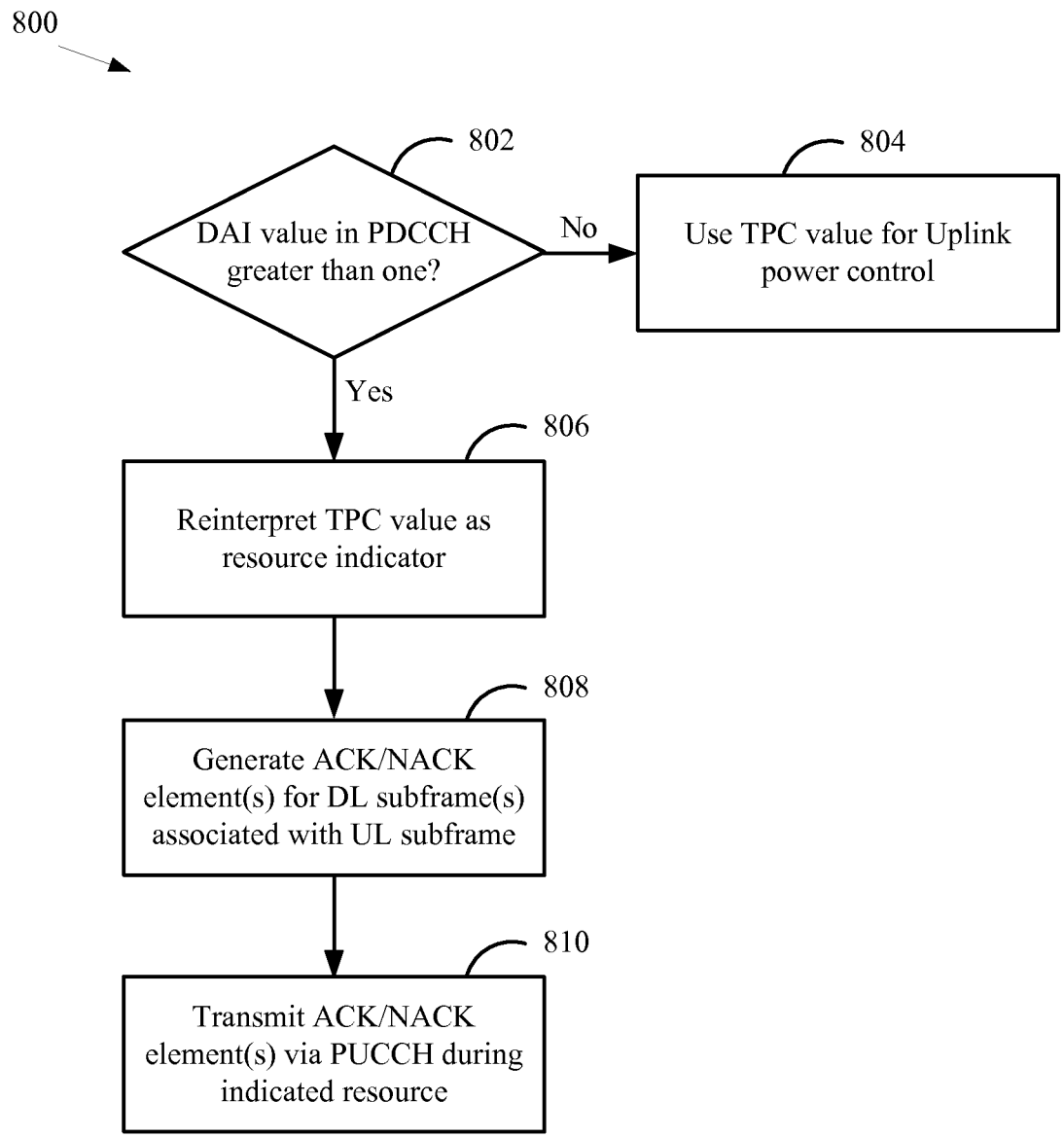
FIG. 8 is a flow chart of a method of wireless communication.

FIG. 8 is a flowchart 800 of a method of wireless communication. The method may be performed by a UE. In one aspect, the UE may determine whether a DAI value is greater than one in a downlink control information (DCI) message. If at block 802, the UE determines the DAI value is not greater than one (e.g., DAI=1) in a DCI message, then at block 804 the UE use a TPC value in the DCI message for power control for uplink communications. By contrast, if at block 802 the UE determines that the DAI value is greater than one in a downlink control information (DCI) message, then at block 806, the UE may reinterpret the TPC value as a resource indicator (e.g., ACK/NACK resource indicator). In one aspect, the UE may receive two or more DCI messages, where each DCI message may contain a TPC value and a DAI value greater than one. In such an aspect, the UE may verify that the TPC values in the two or more DCI messages are the same, and may reinterpret the same value as a resource indicator. In one aspect, the resource indicator may indicate an uplink control channel resource from a plurality of higher layer configured control channel resources for use by the UE. In another aspect, the resource indicator may indicate an offset, relative to the higher layer configured control channel resource, which specifies the control channel resource for use as the uplink control channel resource. Whether the resource indicator is interpreted to indicate an uplink control channel resource or an offset may be determined through prior signaling, operator preferences, system implementation options, default UE settings, etc. In such an aspect, the high layer configured control channel resources may be configured using radio resource control (RRC) signaling. Further, in such an aspect, the uplink control channel may be a PUCCH. Still further, the PUCCH may be formatted as PUCCH format 3.

At block 808, the UE generates ACK/NACK feedback for one or more downlink subframes associated with the uplink subframe using a resource indicated by the resource indicator. In one aspect, with a single carrier, in a non-carrier aggregation implementation, the uplink subframe may be used to provide ACK/NACK feedback for up to 9 downlink subframes.

At block 810, the UE may transmit ACK/NACK feedback on PUCCH via the resource indicated by the ACK/NACK resource indicator. In one aspect, where the UE is communicating using multiple carriers, the uplink control channel resource may be transmitted on the uplink subframe of the primary carrier and may provide ACK/NACK feedback for one or more downlink subframes associated with the primary carrier and one or more secondary carriers. In another aspect, where the UE may communicate using multiple carriers, the uplink control channel resource may be transmitted on the uplink subframe of the primary carrier and may provide ACK/NACK feedback for two or more downlink subframes associated with the primary carrier when only the primary carrier is scheduled.

Figure 9:
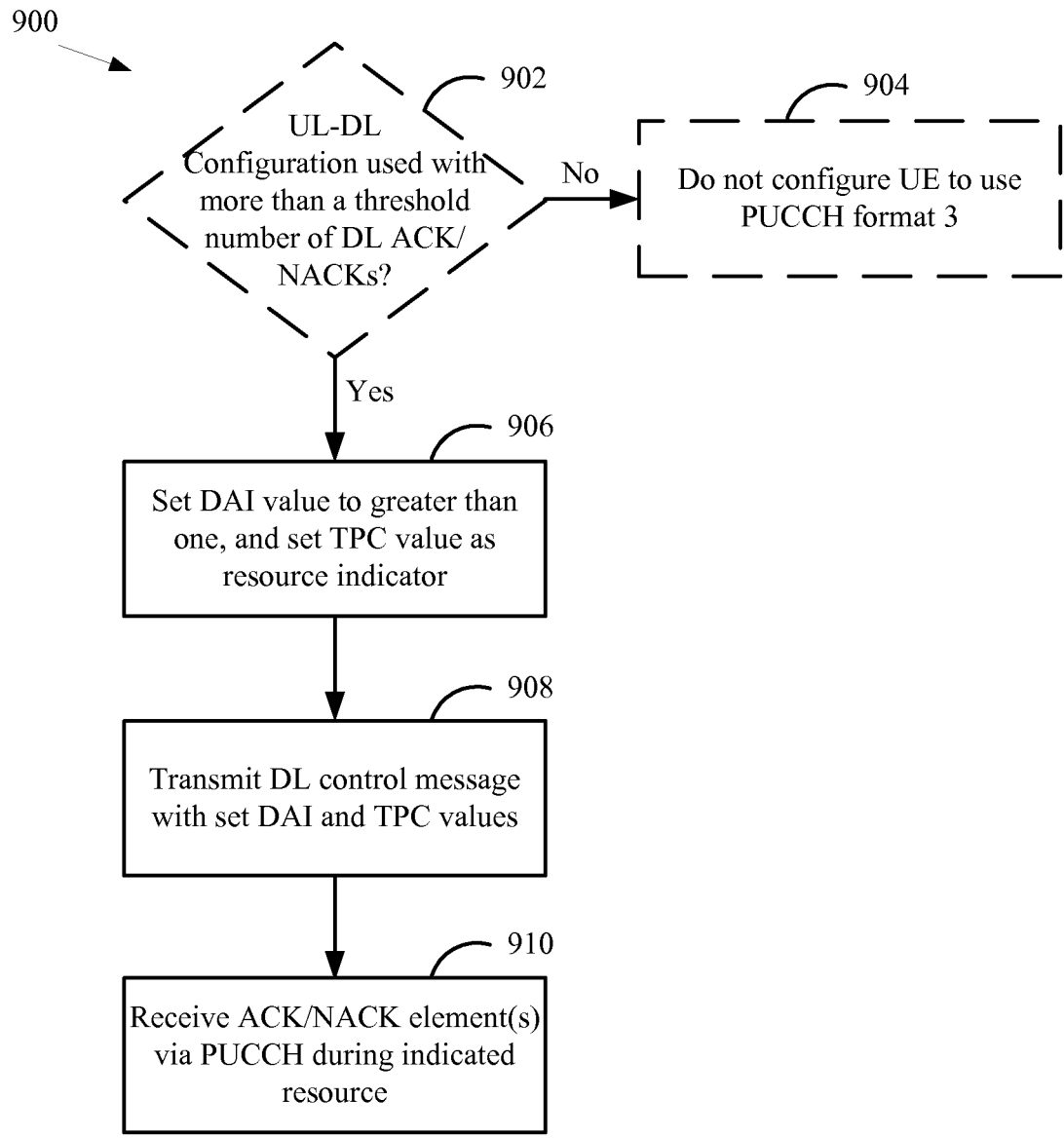
FIG. 9 is a flow chart of another method of wireless communication.

FIG. 9 is a flowchart 900 of another method of wireless communication. The method may be performed by an eNB. In an optional aspect, at block 902, the eNB may determine whether an uplink/downlink configuration, such as the various configuration provided in Table 1, may respond in requesting more than a threshold number of ACK/NACK feedback elements. In aspect, the threshold may be statically or dynamically set, and may be set at a value within a range between 4 and 20. If in the optional aspect, at block 902, the eNB determines that the uplink/downlink configuration being used may not result in a number of ACK/NACK feedback elements above the threshold value, then at block 904, the eNB may not configure the use of PUCCH format 3. If in the optional aspect, at block 902, the eNB determines that the uplink/downlink configuration being used may result in a number of ACK/NACK feedback elements above the threshold value process may continue to block 906.

At block 906 when the eNB configures PUCCH format 3 for the UE, the eNB may set a DAI value to greater than one and a TPC value to a resource indicator value (e.g., 2, 3, etc.). In one aspect, the DAI value may be set to a value greater than one where the eNB determines the uplink/downlink configuration may result in a number of ACK/NACK feedback elements being greater than the threshold value such that PUCCH format 3 is configured for the UE. In one aspect, the threshold value may be four ACK/NACK bits. In one aspect, the eNB may transmit two or more DCI messages, wherein each DCI message contains a TPC value and a DAI value greater than one. In such an aspect, the eNB may set the TPC values in the two or more DCI messages to be the same; the TPC values may both be set to be the resource indicator value. Further, the eNB may use higher layer signaling to configure a resource indicated in the resource indicator for reception of ACK/NACK feedback elements. In such an aspect, the high layer configured control channel resources may be configured using radio resource control (RRC) signaling. Further, in such an aspect, the uplink control channel may be a PUCCH. Still further, the PUCCH may be formatted as PUCCH format 3.

At block 908, the eNB may transmit a DCI message with the DCI value set to greater than 1, and the TPC value set to respect a resource indicator. In response to the transmission, during an uplink subframe, the eNB may receive ACK/NACK feedback in the resource indicated by the resource indicator and using the higher layer formatting (e.g., PUCCH format 3) at block 910.

Figure 10:
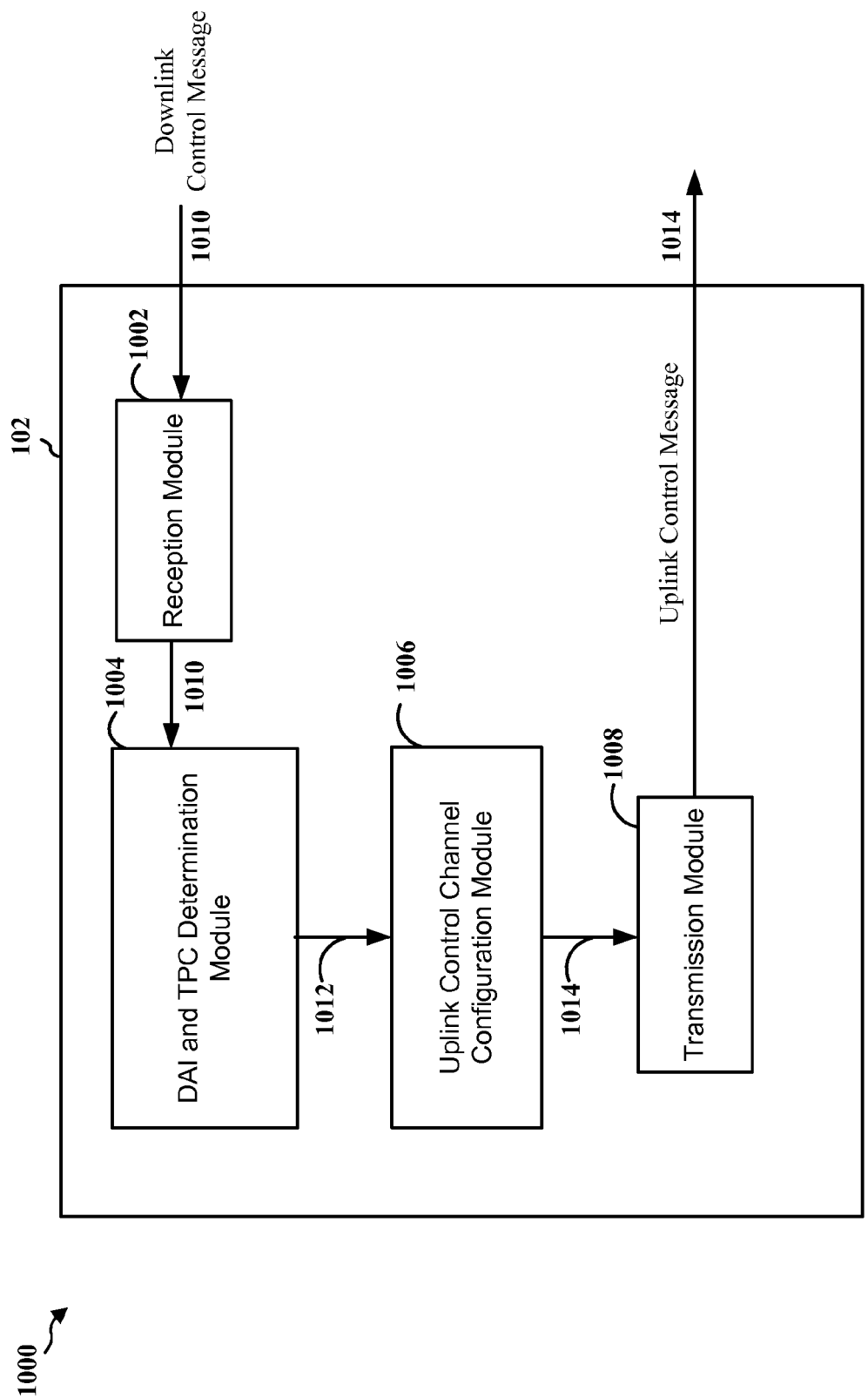
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 102. The apparatus 102 includes a module 1002 that receives a DCI message 1010, and a module 1004 that determines whether a value in the DAI field is greater than one. Upon a determination that the DAI vale is greater than one, module 1004 interprets a TPC value included in the DCI message as a resource indicator 1012. Module 1004 may communicate the resource indicator 1012 to module 1006. Uplink control channel configuration module 1006 uses resource indicator 1012 to determine which PUCCH resource is formatted for ACK/NACK feedback (e.g., PUCCH format 3). Module 1006 generates a uplink control message 1014 and transmits the uplink control message 1014 using transmission module 1008

The apparatus may include additional modules that perform each of the steps of the algorithm in the aforementioned flow charts FIG. 8. As such, each step in the aforementioned flow charts FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
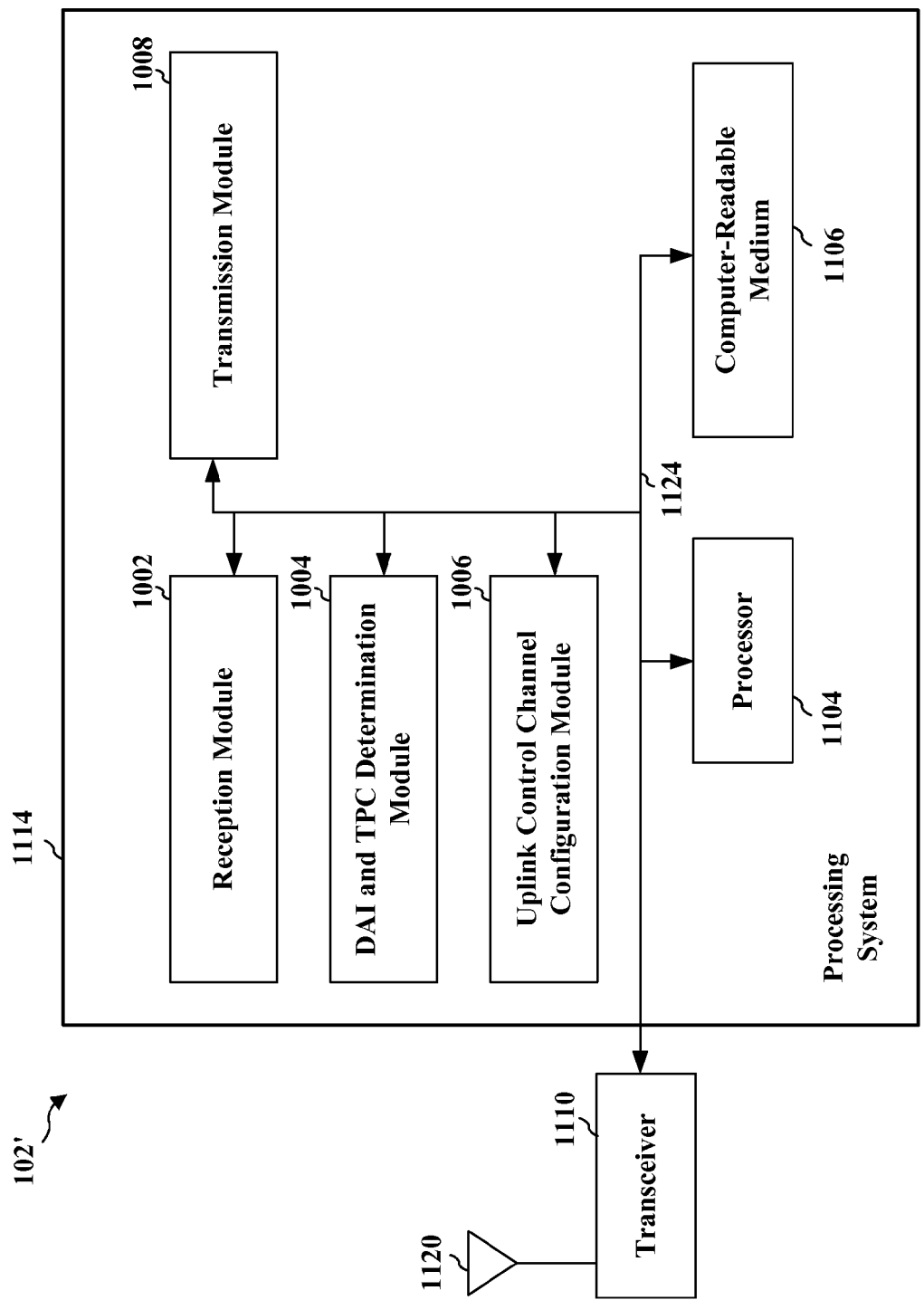
FIG. 11 is a diagram illustrating an example of a hardware implementation for an apparatus employing a processing system.

FIG. 11 is a diagram illustrating an example of a hardware implementation for an apparatus 102' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1002, 1004, 1006, 1008, and the computer-readable medium 1106. The bus 1124 may also link various other circuits such as timing sources, peripherals, voltage regulators, and power management circuits, which are well known in the art, and therefore, will not be described any further.

Processing system 1114 may be coupled to a transceiver 1110. The transceiver 1110 may be coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system may further include modules 1002, 1004, 1006, and 1008. The modules may be software modules running in the processor 1104, resident/stored in the computer readable medium 1106, one or more hardware modules coupled to the processor 1104, or some combination thereof. The processing system 1114 may be a component of the UE 650 and may include the memory 660 and/or at least one of the TX processor 668, the RX processor 656, and the controller/processor 659.

In one configuration, the apparatus 102/102' for wireless communication includes means for receiving a downlink grant for scheduling data transmissions, wherein the downlink grant includes a TPC command and a DAI for an uplink subframe, means for determining that a value for at least one of the TPC commands is an ACK/NACK resource indicator for an uplink control channel resource based on a value of the DAI, and means for transmitting, during the uplink subframe, one or more ACK/NACK feedback elements using the uplink control channel resource. In one aspect, apparatus 102/102' may include means for receiving the TPC command, and means for reinterpreting the TPC command as the ACK/NACK resource indicator when the DAI is greater than one. In such an aspect, the ACK/NACK resource indicator may indicate the uplink control channel resource from a plurality of higher layer configured control channel resources, an offset, relative to the higher layer configured control channel resource, which specifies the control channel resource for use as the uplink control channel resource, etc. In such an aspect, the means for receiving may include means for receiving a second downlink grant including a second TPC command and a second DAI, the means for determining may include means for determining that the second TPC command has a same value as the first TPC command, and the means for reinterpreting may include means for reinterpreting both the first TPC command and the second TPC command as the ACK/NACK resource indicator when the DAIs are greater than one. In one aspect, the high layer configured control channel resources are configured using RRC signaling. In one aspect, the uplink control channel is a PUCCH and the uplink control channel resource is formatted as PUCCH format 3. In one aspect, apparatus 102/102' may be operable for TDD operations. In one aspect, apparatus 102/102' may be operable for single carrier operations. In one aspect, apparatus 102/102' may be operable for multiple carrier operations including a primary carrier and one or more secondary carriers, where the uplink control channel resource is transmitted on the uplink subframe of the primary carrier and where ACK/NACK feedback is provided for one or more downlink subframes associated with the primary carrier and the one or more secondary carriers.

The aforementioned means may be one or more of the aforementioned modules of the apparatus 102 and/or the processing system 1114 of the apparatus 102' configured to perform the functions recited by the aforementioned means. As described supra, the processing system 1114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 12:
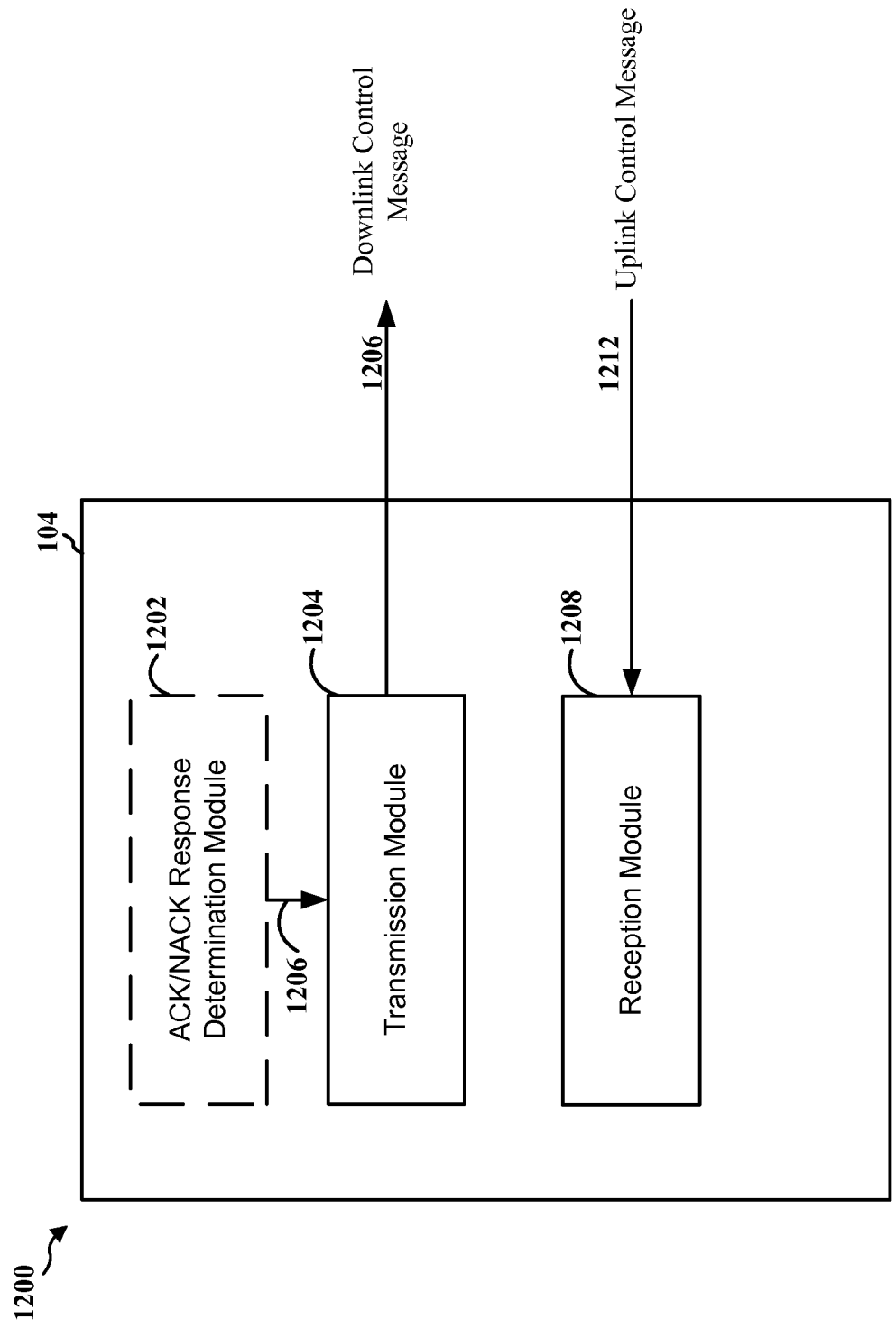
FIG. 12 is a conceptual data flow diagram illustrating the data flow between different modules/means/components in another exemplary apparatus.

FIG. 12 is a conceptual data flow diagram 1200 illustrating the data flow between different modules/means/components in an exemplary apparatus 104. The apparatus 104 includes an optional module 1202 that may determine when ACK/NACK feedback associated with an uplink/downlink configuration may result in more than a threshold number of ACK/NACK feedback elements being generated. Apparatus 104 may generate a DCI message 1206 and may communicate the message using transmission module 1204. Transmission module 1204 transmits the DCI message 1206 that may include a field indicating a DCI value greater than one and a use a TPC value to represent an ACK/NACK resource indicator.

Apparatus 104 may further include a module 1208 can receive an uplink control message 1212 that includes a resource, indicated by the resource indicator, with ACK/NACK feedback elements from the UE 102. In one aspect, the uplink control message may be transmitted on PUCCH using PUCCH format 3.

The apparatus may include additional modules that perform each of the steps of the algorithm in the aforementioned flow chart FIG. 9. As such, each step in the aforementioned flow chart FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
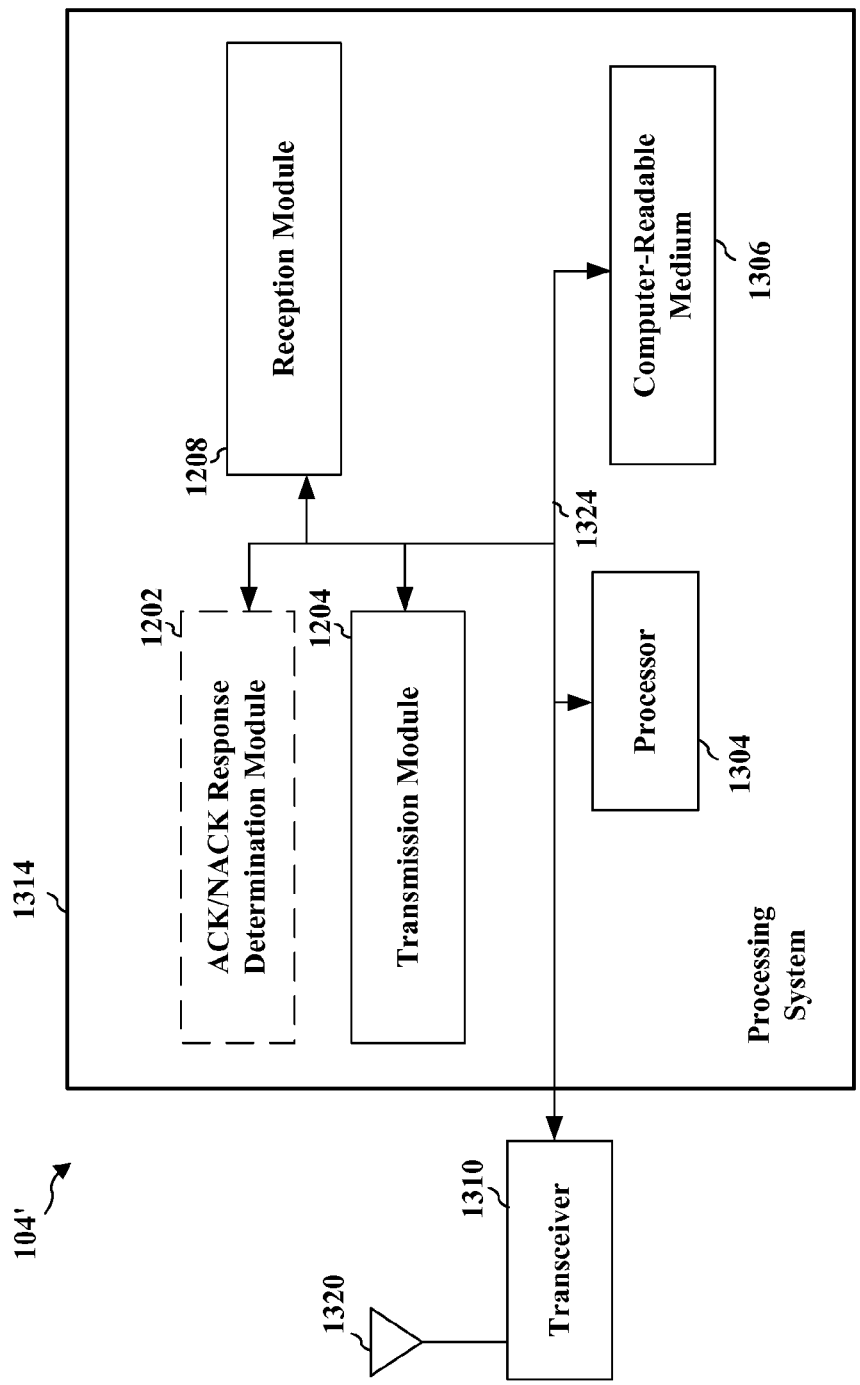
FIG. 13 is a diagram illustrating an example of a hardware implementation for another apparatus employing a processing system.

FIG. 13 is a diagram illustrating an example of a hardware implementation for an apparatus 104' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1202, 1204, 1208, and the computer-readable medium 1306. The bus 1324 may also link various other circuits such as timing sources, peripherals, voltage regulators, and power management circuits, which are well known in the art, and therefore, will not be described any further.

Processing system 1314 may be coupled to a transceiver 1310. The transceiver 1310 may be coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system may further include modules 1202, 1204, and 1208. The modules may be software modules running in the processor 1304, resident/stored in the computer readable medium 1306, one or more hardware modules coupled to the processor 1304, or some combination thereof. The processing system 1314 may be a component of the eNB 610 and may include the memory 676 and/or at least one of the TX processor 616, the RX processor 670, and the controller/processor 675.

In one configuration, the apparatus 104/104' for wireless communication includes means for transmitting a downlink grant for scheduling data transmissions, wherein the downlink grant includes a TPC command and a DAI for an uplink subframe, wherein the DAI is greater than 1 and wherein the TPC command is replaced with an ACK/NACK resource indicator, and means for receiving a signal including uplink control channel information, where ACK/NACK feedback for one or more downlink subframes associated with the uplink subframe are included in an uplink control channel resource indicated by the ACK/NACK resource indicator. In one aspect, apparatus 104/104' for wireless communication includes means for determining an uplink-downlink configuration results in greater than a threshold number of downlink subframes ACK/NACK feedback elements. In such an aspect, the ACK/NACK resource indicator may indicate the uplink control channel resource from a plurality of higher layer configured control channel resources, an offset, relative to the higher layer configured control channel resource, which specifies the control channel resource for use as the uplink control channel resource, etc. In other words, a TCP command may not be codes with TPC information when DAI is greater than 1, and instead the TPC value may be used as an AC/NACK resource indicator. In one aspect, the high layer configured control channel resources are configured using RRC signaling. In one aspect, the uplink control channel is a PUCCH and the uplink control channel resource is formatted as PUCCH format 3. In one aspect, apparatus 104/104' may be operable for TDD operations. In one aspect, apparatus 104/104' may be operable for single carrier operations. In one aspect, apparatus 104/104' may be operable for multiple carrier operations including a primary carrier and one or more secondary carriers, where the uplink control channel resource is transmitted on the uplink subframe of the primary carrier and where ACK/NACK feedback is provided for one or more downlink subframes associated with the primary carrier and the one or more secondary carriers.

The aforementioned means may be one or more of the aforementioned modules of the apparatus 104 and/or the processing system 1314 of the apparatus 104' configured to perform the functions recited by the aforementioned means. As described supra, the processing system 1314 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Further, LTE-Advanced UEs use spectrum in 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric frequency division duplexing (FDD) assignments will conserve spectrum and are a good fit for the typically asymmetric bandwidth utilization by broadband subscribers.

For the LTE-Advanced mobile systems, two types of carrier aggregation (CA) methods have been proposed, continuous CA and non-continuous CA. They are illustrated in FIGS. 5A and 5B. Non-continuous CA occurs when multiple available component carriers are separated along the frequency band (FIG. 5B). On the other hand, continuous CA occurs when multiple available component carriers (CCs) are adjacent to each other (FIG. 5A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different.

In an aspect, transmission blocks (TBs) may be aggregated from different component carriers at the medium access control (MAC) layer for an LTE-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNB. The reason is that the channel conditions of two (or more) adjacent cells (eNBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

Acknowledgement (ACK) and/or negative acknowledgement (NAK) protocols are employed by wireless communication systems to determine whether transmissions between UEs and eNBs were properly received. Depending on the communication protocol, different numbers of bits may be allocated for ACK/NAK purposes. For FDD a maximum of 10 ACK/NAK bits are supported, where 2 bits are assigned to each component carrier in carrier aggregation. For TDD a maximum of 20 ACK/NAK bits are supported. For PUCCH schemes in 3GPP Release 10, UEs may support up to 4 ACK/NAK bits for Format 1b channel selection and a full range of ACK/NAK bits for DFT-S-OFDM (Discrete Fourier Transform Spread Orthogonal Frequency Division Multiplexing).

When performing ACK/NAK, an eNB may know whether a downlink component carrier (CC) is scheduled or not, and may perform ACK/NAK decoding accordingly. For CCs not scheduled, there is no need to perform ACK/NAK detection.

The number of bits allocated to ACK/NAK may impact a variety of operations in wireless communication. For DFT-S-OFDM, the ACK/NAK payload size may impact Reed-Muller coding as shown in page 5 of Appendix A. For example, if greater than 11 bits are allocated to ACK/NAK, the ACK/NAK bits may be segmented into two blocks for operation. The number of ACK/NAK bits may also impact PUCCH power control, as well as resource determination for uplink control information (UCI) when the UCI is piggybacked on PUSCH.

In Release-8, seven TDD configurations are supported, as shown above in Table 1.

The subframes are divided into downlink subframes (D), uplink subframes (U), and special subframes (S), which may be used for various purposes.

In Release-8 TDD, ACK/NAK feedback may be configured in several ways. A single UL subframe may provide ACK/NAK for multiple subframes based on a downlink (DL) HARQ timing relationship. For example, a single UL subframe may provide feedback for 1, 2, 3, 4, or 9 subframes. For example, in TDD configuration 5 shown above in Table 1, a single UL subframe provides feedback for up to nine subframes.

A UE may be configured with two ACK/NAK feedback modes. In a bundling mode (using up to two ACK/NAK bits), a logical AND operation is employed over the ACK/NAKs for all DL subframes corresponding to the same UL subframe, on a per codeword basis. That is, if all codewords for the corresponding DL subframes are properly received, the UE will respond with an ACK. If a single codeword is not properly received, the UE will respond with an NAK.

In a multiplexing mode (using up to four ACK/NAK bits) the UE will combine codewords from multiple sources (for example in a MIMO environment) in a DL subframe and ACK/NAK that subframe (and other designated subframes) in the corresponding UL subframe according to the configuration shown above in Table 1. The extreme case of TDD configuration 5 does not support the above multiplexing.

In Release 8, for TDD UL configurations 1-6 2-bit a DAI (downlink assignment index) is present in DL DCI (downlink control information) formats 1/1A/1B/1D/2/2A/2B. The DAI denotes the number of PDCCH(s) with assigned PDSCH transmission(s) and PDCCH indicating DL SPS (semi-persistent scheduling) release up to the present subframe within subframe(s) n-k, k belongs to K. There is also a 2 bit DAI in UL DCI format 0. The DAI detected by the UE in subframe n-k' represents the total number of subframes with PDSCH transmissions and with PDCCH indicating DL SPS release within subframes n-k, k belongs to K. The parameter n is the current subframe index. K is a set of values {k1, k1, ... km} which denotes the set of downlink subframes, i.e. {n-k1, k-k2, ..., n-km} associated with the uplink subframe n. If there is a PUSCH transmission scheduled in uplink subframe n, the corresponding uplink grant is sent in subframe n-k'. The DAI, which is not present for FDD systems, helps a UE to detect the missing downlink grants and facilitates more efficient ACK/NAK feedback.

When ACK/NAK co-exists with a positive scheduling request (SR), ACK/NAK is transmitted with the SR resource as described in above in Table 2.

Table 2 shows mapping between multiple ACK/NACK responses and bits b(0) and b(1). When ACK/NAK co-exists with a channel quality indicator (CQI)/precoding matrix indicator (PMI)/rank indicator (RI), PUCCH format 2/2A/2B is used with b(0), b(1) encoded the same as the case ACK/NAK+SR, as shown above in Table 2.

ACK/NAK feedback design in LTE Rel-8 TDD may be inefficient, particularly when ACK/NAK coexists with SR or CQI. As described below, there are benefits to be gained by using the new PUCCH format (Format 3) for TDD UEs even when the UE is not configured with carrier aggregation (non-CA). Described below are several aspects described for designing ACK/NAK feedback, along with multiplexing with SR/CQI for non-CA TDD UEs.

In one aspect spatial bundling may be implemented in a single carrier TDD operation with PUCCH format 3. As is well known, spatial bundling includes bundling ACK/NAK messages across codewords, for example. In this non-CA case, a UE may experience challenging channel conditions. For CA UEs, the use of ACK/NAK overhead reduction is not as pressing. For non-CA UEs, there is a desire to feedback a fewer number of ACK/NAK bits if the downlink throughput degradation is reasonable. For example, in carrier aggregation spatial bundling may be used only if the total number of ACK/NAK bits is over 20 bits. Two coding schemes are supported in CA, single Reed-Muller (RM) and dual RM, with single RM used for coding schemes of 11 bits or fewer.

In one aspect, for non-CA TDD cases with PUCCH format 3, spatial bundling may be applied in accordance with a system configuration. For example, in one embodiment spatial bundling is applied only when the number of ACK/NAK bits is greater than 11, thus reducing the need to employ dual Reed-Muller coding for non-CA in the case of ACK/NAK only transmission. However, dual Reed-Muller coding may still be employed in certain situations, such as when CQI is multiplexed with ACK/NAK as described below. In another embodiment, spatial bundling is always applied in single carrier operation with PUCCH format 3. In yet another embodiment, spatial bundling is never applied. In still another embodiment, spatial bundling is applied in accordance with signaling from a higher layer, for example, layer 3 and above.

In another aspect, a codebook may be defined in single carrier TDD operation with PUCCH format 3 based on a system configuration. In carrier aggregation the codebook is based on the number of configured component carriers (CCs) and the downlink transmission mode for each CC. As is well known, downlink transmission modes in 3GPP Release 8 include single antenna port 0, transmit diversity, open loop spatial multiplexing, closed loop spatial multiplexing, multi user MIMO, closed loop pre-coding, and single antenna port 5. No DAI in the CC-domain is supported. In the non-carrier aggregation case, DAIs in downlink grants (i.e., resource information transmitted from the eNB to the UE) may always be present. All subframes have the same DL transmission mode. The definition of DAI makes it possible to define the codebook based on the DAI. In one system configuration, if the UE does not receive any DL grants, there will be no PUCCH transmission. In another system configuration, if the UE receives a DL grant, the ACK/NAK bit(s) for the grant will start at bit (DAI-1)*K, where K is the number of ACK/NAK bits per subframe. For example, with the first grant, if DAI=1, the ACK/NAK bit(s) start at bit 0. If DAI=3, and K=2, the ACK/NAK bit(s) start at bit 4. In still another system configuration, if the UE detects a missing DL grant, it may feedback discontinuous transmission (DTX) either explicitly or implicitly (by coding DTX the same as NAK). In yet another system configuration, the codebook is based on the downlink transmission mode and number of downlink subframes associated with the uplink subframe, as determined by the TDD configuration. For example, when the DL transmission mode is mode 4, which is for closed-loop MIMO, when there are M DL subframes associated with the UL subframe from the specification, the number of bits to feedback would be 2×M.

In another aspect of the present disclosure, power control may be determined in single carrier TDD operation with PUCCH format 3. As DAI only indicates the total number of downlink grants, and the UE may miss the last grant, the UE may not have knowledge of the total number of scheduled subframes. PUCCH format 3 power control may be based on two system configurations. In one alternative, the power control is determined based on the downlink transmission mode and number of downlink subframes associated with an uplink sub frame. In another alternative, the power control is determined based on the downlink transmission mode and the number of detected downlink subframes (with PDCCH grants) associated with an uplink subframe.

In essence, the power control is driven by the number of ACK/NAK bits to be fed back. For Alternative 1 (above), the number of ACK/NAK bits is determined by the DL transmission mode and the number of associated DL subframes. For Alt2, the number of ACK/NACK bits is determined by the DL transmission mode and the number of DL subframes where PDCCH grants are detected.

In another aspect, ACK/NAK and a scheduling request (SR) may be multiplexed, with the SR bit (ON/OFF) appended at the end of the ACK/NAK bits. In another aspect, ACK/NAK and CQI may be multiplexed, with the CQI/PMI/RI appended at the end. To ensure the eNB and UE are in alignment with regard to the location of the SR or CQI bits, it may be desired to employ a scheme for locating the bits in a manner both the eNB and UE can determine. One method for doing so is to determine ACK/NAK bit location based on the DL transmission mode and the number of DL subframes associated with the UL subframe. In the case of CQI+ACK/NAK+SR, the ordering may be ACK/NAK bits followed by SR, followed by CQI. In either of these aspects, the maximum bitwidth is 21 bits. For example, if spatial bundling is performed in TDD configuration five, nine ACK/NAK bits are used. The SR uses one bit, and CQI/PMI/RI takes, at most, 11 bits (for a total of 21 bits).

In another aspect, resource configuration may be determined in single carrier TDD operation with PUCCH format 3. In the case of non-CA, the 2-bit TPC on PDCCHs of some downlink sub frame(s) associated with a given uplink subframe may be used as a resource indication (ACK/NAK resource indicator or ARI) for PUCCH format 3. The subframes may be explicitly defined (or configured) or implicitly defined. For example, the 2-bit TPC in one PDCCH with DAI>1, e.g. DAI=2, may be re-used as ARI, while the remaining PDCCH carry the regular power control commands for PUCCH. For example, the RRC configures four resources and the 2-bit ARI indicates one of them. Alternatively, RRC configures a single resource and ARI is used as an offset. Alternatively, a UE is configured by a higher layer with only one resource without ARI.

In an aspect, a method may include a determination to apply spatial bundling for acknowledgement/negative acknowledgement (ACK/NAK) feedback in single carrier time division duplexed (TDD) operation with physical uplink control channel (PUCCH) format 3 according to a system configuration. The method may further apply spatial bundling based on the determination.

In another aspect, a method may be implemented for defining a codebook for acknowledgement/negative acknowledgement (ACK/NAK) feedback in single carrier time division duplexed (TDD) operation with physical uplink control channel (PUCCH) format 3 based on a system configuration. The method may further transmit in accordance with the defined codebook.

In another aspect, a method may be implemented for determining physical uplink control channel (PUCCH) power control information for acknowledgement/negative acknowledgement (ACK/NAK) feedback with PUCCH format 3 in single carrier time division duplexing (TDD) according to a system configuration. The method may further transmit in accordance with the determined PUCCH power control information.

In another aspect, a method may be implemented for multiplexing a scheduling request (SR) and/or a channel quality indicator (CQI) with acknowledgement/negative acknowledgement (ACK/NAK) bits in physical uplink control channel (PUCCH) format 3 for single carrier time division duplexing (TDD) operation. The method may further transmit the multiplexed bits with the PUCCH format 3.

In another aspect, a method may be implemented for receiving transmission power control (TPC) commands for an uplink subframe in single carrier time division duplexed (TDD) operation. The method may further reinterpret at least one of the TPC commands as a resource indicator for physical uplink control channel (PUCCH) format 3.

In another aspect, a method may be implemented for receiving a higher layer indication configuring a resource for acknowledgement/negative acknowledgement (ACK/NAK) feedback with physical uplink control channel (PUCCH) format 3 in single carrier time division duplexing (TDD) operation. The method may further transmit in accordance with the higher layer indication.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A method for wireless communication comprising:
   receiving a downlink grant for scheduling data transmissions, wherein the downlink grant includes a transmission power control (TPC) command and a downlink assignment index (DAI) for an uplink subframe;
   determining whether the TPC command is an acknowledgement/negative acknowledgement (ACK/NACK) resource indicator for an uplink control channel resource based on a value of the DAI, wherein the determining comprises:
      using the TPC command for power control for a communication on the uplink subframe when the DAI is equal to one, and
      reinterpreting the TPC command as the ACK/NACK resource indicator when the DAI is greater than one; and
   transmitting, during the uplink subframe, one or more ACK/NACK feedback elements using the uplink control channel resource when the DAI is greater than one.

2. The method of claim 1, wherein the determining further comprises:
   receiving the TPC command where the DAI is greater than one.

3. The method of claim 2, wherein the receiving further comprises receiving a second downlink grant including a second TPC command and a second DAI, where the second DAI is greater than one;
   wherein the determining further comprises determining that the second TPC command has a same value as the TPC command, and
   wherein the reinterpreting further comprises reinterpreting both the TPC command and the second TPC command as the ACK/NACK resource indicator.

4. The method of claim 1, wherein the TPC command is determined to be the ACK/NACK resource indicator, the ACK/NACK resource indicator indicating the uplink control channel resource from a plurality of higher layer configured control channel resources; or an offset, relative to a higher layer configured control channel resource, which specifies the control channel resource for use as the uplink control channel resource.

5. The method of claim 4, wherein the higher layer configured control channel resources are configured using radio resource control (RRC) signaling.

6. The method of claim 1, wherein the method is performed as part of a time division duplex (TDD) operation.

7. The method of claim 1, wherein the uplink control channel resource is associated with an uplink control channel, and wherein the uplink control channel is a physical uplink control channel (PUCCH).

8. The method of claim 7, wherein the resource is formatted with PUCCH format 3.

9. The method of claim 1, wherein the uplink control channel resource includes ACK/NACK information for each of one or more downlink subframes associated with the uplink subframe.

10. The method of claim 1, wherein the method is performed as part of a single carrier operation.

11. The method of claim 1, wherein the method is performed as part of a multi-carrier operation including a primary carrier and one or more secondary carriers, wherein the uplink control channel resource is transmitted on the uplink subframe of the primary carrier and provides ACK/NACK feedback for one or more downlink subframes associated with the primary carrier and the one or more secondary carriers.

12. A method of wireless communications, comprising:
   transmitting a downlink grant for scheduling data transmissions, wherein the downlink grant includes a transmission power control (TPC) command and a downlink assignment index (DAI) for an uplink subframe, wherein the TPC command provides power control for a communication on the uplink subframe when the DAI is equal to one, and wherein the TPC command is replaced with an acknowledgement/negative acknowledgement (ACK/NACK) resource indicator when the DAI is greater than one; and
   receiving a signal including uplink control channel information, where ACK/NACK feedback for one or more downlink subframes associated with the uplink subframe are included in an uplink control channel resource indicated by the ACK/NACK resource indicator when the DAI is greater than one.

13. The method of claim 12, further comprising:
determining that an uplink-downlink configuration results in greater than a threshold number of downlink subframes ACK/NACK feedback elements.

14. The method of claim 13, wherein the threshold is 4 ACK/NACK responses.

15. The method of claim 12, wherein the uplink control channel resource is associated with an uplink control channel, and wherein the uplink control channel is a physical uplink control channel (PUCCH) and wherein the uplink control channel resource is formatted as PUCCH format 3.

16. The method of claim 12, wherein the ACK/NACK resource indicator indicates:
the uplink control channel resource from a plurality of higher layer configured control channel resources; or
an offset, relative to a higher layer configured control channel resource, which specifies the control channel resource for use as the uplink control channel resource.

17. The method of claim 16, wherein the high layer configured control channel resources are configured using radio resource control (RRC) signaling.

18. The method of claim 12, wherein the method is performed as part of a time division duplex (TDD) operation.

19. The method of claim 12, wherein the method is performed as part of a single carrier operation.

20. The method of claim 12, wherein the method is performed as part of a multi-carrier operation including a primary carrier and one or more secondary carriers, wherein the uplink control channel resource is transmitted on the uplink subframe of the primary carrier and provides ACK/NACK feedback for one or more downlink subframes associated with the primary carrier and the one or more secondary carriers.

21. An apparatus for wireless communication, comprising:
means for receiving a downlink grant for scheduling data transmissions, wherein the downlink grant includes a transmission power control (TPC) command and a downlink assignment index (DAI) for an uplink subframe;
means for determining whether the TPC command is an acknowledgement/negative acknowledgement (ACK/NACK) resource indicator for an uplink control channel resource based on a value of the DAI, wherein the means for determining is configured to:
use the TPC command for power control for a communication on the uplink subframe when the DAI is equal to one, and
reinterpret the TPC command as the ACK/NACK resource indicator when the DAI is greater than one; and
means for transmitting, during the uplink subframe, one or more ACK/NACK feedback elements using the uplink control channel resource when the DAI is greater than one.

22. The apparatus of claim 21, wherein the means for determining further comprises:
means for receiving the TPC command where the DAI is greater than one.

23. The apparatus of claim 22, wherein the means for receiving further comprises means for receiving a second downlink grant including a second TPC command and a second DAI, where the second DAI is greater than one;
wherein the means for determining further comprises means for determining that the second TPC command has a same value as the TPC command; and
wherein the means for reinterpreting further comprises means for reinterpreting both the TPC command and the second TPC command as the ACK/NACK resource indicator.

24. An apparatus of wireless communications, comprising:
means for transmitting a downlink grant for scheduling data transmissions, wherein the downlink grant includes a transmission power control (TPC) command and a downlink assignment index (DAI) for an uplink subframe, wherein the TPC command provides power control for a communication on the uplink subframe when the DAI is equal to one, and wherein the TPC command is replaced with an acknowledgement/negative acknowledgement (ACK/NACK) resource indicator when the DAI is greater than one; and
means for receiving a signal including uplink control channel information, where ACK/NACK feedback for one or more downlink subframes associated with the uplink subframe are included in an uplink control channel resource indicated by the ACK/NACK resource indicator when the DAI is greater than one.

25. The apparatus of claim 24, further comprising:
means for determining that an uplink-downlink configuration results in greater than a threshold number of downlink subframes ACK/NACK feedback elements.

26. The apparatus of claim 25, wherein the threshold is 4 ACK/NACK responses.

27. A computer program product, comprising:
a non-transitory computer-readable medium comprising code for:
receiving a downlink grant for scheduling data transmissions, wherein the downlink grant includes a transmission power control (TPC) command and a downlink assignment index (DAI) for an uplink subframe;
determining whether the TPC command is an acknowledgement/negative acknowledgement (ACK/NACK) resource indicator for an uplink control channel resource based on a value of the DAI, wherein the determining comprises:
using the TPC command for power control for a communication on the uplink subframe when the DAI is equal to one, and
reinterpreting the TPC command as the ACK/NACK resource indicator when the DAI is greater than one; and
transmitting, during the uplink subframe, one or more ACK/NACK feedback elements using the uplink control channel resource when the DAI is greater than one.

28. The computer program product of claim 27, wherein the non-transitory computer-readable medium further comprises code for:
receiving the TPC command where the DAI is greater than one.

29. A computer program product, comprising:
a non-transitory computer-readable medium comprising code for:
transmitting a downlink grant for scheduling data transmissions, wherein the downlink grant includes a transmission power control (TPC) command and a downlink assignment index (DAI) for an uplink subframe, wherein the TPC command provides power control for a communication on the uplink subframe when the DAI is equal to one, and wherein the TPC command is replaced with an acknowledgement/negative acknowledgement (ACK/NACK) resource indicator when the DAI is greater than one; and receiving a signal including uplink control channel information, where ACK/NACK feedback for one or more downlink subframes associated with the uplink subframe are included in an uplink control channel resource indicated by the ACK/NACK resource indicator when the DAI is greater than one.

30. The computer program product of claim 29, wherein the non-transitory computer-readable medium further comprises code for:

determining that an uplink-downlink configuration results in greater than a threshold number of downlink subframes ACK/NACK feedback elements.

31. An apparatus for wireless communication, comprising:

a processing system configured to:

receive a downlink grant for scheduling data transmissions, wherein the downlink grant includes a transmission power control (TPC) command and a downlink assignment index (DAI) for an uplink subframe;

determine whether the TPC command is an acknowledgement/negative acknowledgement (ACK/NACK) resource indicator for an uplink control channel resource based on a value of the DAI, wherein the processing system is configured to determine by:

using the TPC command for power control for a communication on the uplink subframe when the DAI is equal to one, and reinterpreting the TPC command as the ACK/NACK resource indicator when the DAI is greater than one; and transmit, during the uplink subframe, one or more ACK/NACK feedback elements using the uplink control channel resource when the DAI is greater than one.

32. The apparatus of claim 31, wherein the processing system is further configured to:

receive the TPC command where the DAI is greater than one.

33. The apparatus of claim 32, wherein the processing system is further configured to:

receive a second downlink grant including a second TPC command and a second DAI, where the second DAI is greater than one;

determine that the second TPC command has a same value as the TPC command; and reinterpret both the TPC command and the second TPC command as the ACK/NACK resource indicator.

34. The apparatus of claim 31, wherein the TPC command is determined to be the ACK/NACK resource indicator, the ACK/NACK resource indicator indicating the uplink control channel resource from a plurality of higher layer configured control channel resources; or an offset, relative to a higher layer configured control channel resource, which specifies the control channel resource for use as the uplink control channel resource.

35. An apparatus for wireless communication, comprising:

a processing system configured to:

transmit a downlink grant for scheduling data transmissions, wherein the downlink grant includes a transmission power control (TPC) command and a downlink assignment index (DAI) for an uplink subframe, wherein the TPC command provides power control for a communication on the uplink subframe when the DAI is equal to one, and wherein the TPC command is replaced with an acknowledgement/negative acknowledgement (ACK/NACK) resource indicator when the DAI is greater than one; and receive a signal including uplink control channel information, where ACK/NACK feedback for one or more downlink subframes associated with the uplink subframe are included in an uplink control channel resource indicated by the ACK/NACK resource indicator when the DAI is greater than one.

36. The apparatus of claim 35, wherein the processing system is further configured to:

determine that an uplink-downlink configuration results in greater than a threshold number of downlink subframes ACK/NACK feedback elements.

* * * * *